United States Patent
Schakel

(12) 
(10) Patent No.: US 6,357,571 B1
(45) Date of Patent: Mar. 19, 2002

(54) HYDRAULIC DEVICE TO LIMIT SLIP

(75) Inventor: Mark A. Schakel, Hendersonville, NC (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/516,141

(22) Filed: Mar. 1, 2000

(51) Int. Cl.⁷ .............................................. F16H 48/26
(52) U.S. Cl. ........................................ 192/216; 475/89
(58) Field of Search .................. 192/216, 60; 188/302, 188/303; 475/86, 87, 88, 89, 90

(56) References Cited

U.S. PATENT DOCUMENTS

| | | | | |
|---|---|---|---|---|
| 2,207,310 A | * | 7/1940 | Ballamy ....................... | 475/89 |
| 3,230,795 A | * | 1/1966 | Mueller ........................ | 475/89 |
| 3,393,582 A | * | 7/1968 | Mueller ........................ | 475/89 |
| 3,393,583 A | * | 7/1968 | Mueller ........................ | 475/89 |
| 3,577,803 A | * | 5/1971 | Mueller ................... | 192/60 X |
| 3,831,461 A | * | 8/1974 | Mueller ........................ | 475/89 |
| 5,927,422 A | | 7/1999 | Schakel | |

FOREIGN PATENT DOCUMENTS

| | | | | | |
|---|---|---|---|---|---|
| DE | 35 36 578 | * | 4/1986 | .................. | 475/88 |
| DE | 37 20 280 | * | 1/1988 | .................. | 475/88 |
| JP | 61-197843 | * | 9/1986 | .................. | 475/89 |

OTHER PUBLICATIONS

Jun. 1992 article by Christopher Sawyer entitled: Disco–Tech: Uncovering ASHA Corporation's small, low–cost vicious coupling replacement reveals some surprises.

* cited by examiner

*Primary Examiner*—Rodney H. Bonck
(74) *Attorney, Agent, or Firm*—Carlson, Gaskey & Olds

(57) ABSTRACT

A hydraulic device to limit slip can be used in the vehicle's main differential and the vehicle's inter-axle differential. The device includes a cylinder body connected to an input shaft, pistons disposed within radial cylinder bores in the cylinder body, and a cam ring connected to the output shaft, and disposed adjacent the pistons. The cylinder body is generally ring-shaped and has at least one pair of cylinder bores connected by an orifice spaced radially around the cylinder body interior bore. One of the radial cylinder bores in the pair is filled with hydraulic fluid. One piston protrudes from its corresponding radial cylinder bore. The cam ring is also generally ring-shaped having one lobe around its outer circumference per radial cylinder bore pair. As the cylinder body rotates along with the input shaft, the pistons interact with the cam ring lobes. The lobe forces the protruding piston into its corresponding radial cylinder bore. The hydraulic fluid is forced through the orifice and into the other radial cylinder bore in the pair and forces the other piston in the pair to protrude from its radial cylinder bore an to contact the cam ring. The interaction between the cam ring and the pistons creates a drag force that causes the cam ring to rotate with the cylinder bore.

24 Claims, 4 Drawing Sheets

HYDRAULIC DEVICE TO LIMIT SLIP

BACKGROUND OF THE INVENTION

This invention generally relates to a device to control torque transmitted through a vehicle's differential and more particularly to a device that hydraulically controls torque transmission.

Differentials are typically found between drive axles in a four-wheel-drive vehicle and between the driven wheel ends in any individual drive axle. A vehicle's inter-axle differential transmits power equally between two axles of a tandem drive axle vehicle and allows for speed differences between the two axles. A vehicle's main differential transmits power equally between two wheel ends of an axle and compensates for speed differences between the wheels due to cornering, slightly mismatched tires, or uneven road conditions.

One disadvantage of conventional differentials is that the feature that allows for differences in axle or wheel speed also, under certain conditions, limits the amount of torque that is transmitted to the axle or wheels. Under all conditions of wheel traction there is always an equal division of axle torque between the axles or wheels. If the driving wheels encounter road surfaces of unequal traction, the wheel with the most traction will receive only as much torque as is transmitted to the wheel with the least traction. Consequently, when a wheel is spinning, the torque transmitted to it is slight and a like amount transmitted to the other wheel usually is not sufficient to propel the vehicle.

The main components of any conventional differential assembly include a differential case containing a spider, side gears, and differential pinions. Relative motion between these components allows the wheels or axles to rotate at different speeds, and this relative motion is what also limits the transfer of torque.

Mechanical devices for limiting or eliminating relative motion between differential components are well known. One common method utilized a shift collar connected through linkage to one of the differential side gears. When wheel slip occurs, the shift collar is moved to engage with a connection on the differential case. This eliminates the relative motion of components within the differential case and efficiently transfers the torque to the wheels to overcome the poor traction conditions. One disadvantage of this system is that it requires driver intervention to activate and de-activate.

Another known device used to limit slippage in differentials utilizes a hydraulic pump built into the differential to compress a clutch pack between driven wheels. When wheelspin occurs, the hydraulic pump compresses the clutch pack where friction created between plates within the clutch pack transfers drive torque to both wheels regardless of tractive conditions between the wheels and the road surface. This approach is limited primarily because of the wear that is produced within the clutch pack and the subsequent contamination of the axle lubrication fluid.

SUMMARY OF THE INVENTION

The present invention overcomes the above problems with known devices that limit slip. This invention can be use on a vehicle's interaxle differential or main differential.

The inventive hydraulic device preferably includes a cylinder body, pistons, and a cam ring. The cylinder body is preferably generally ring-shaped with an interior bore surrounding a longitudinal axis.

Further, the cylinder body preferably has at least one pair of cylinder bores spaced radially around the cylinder body interior bore. One of the radial cylinder bores in the pair is filled with hydraulic fluid. An orifice connects the cylinder bores. The cylinder body is connected to and rotates with the differential case.

Pistons are disposed within each radial cylinder bore. Each cylinder bore pair includes a first radial cylinder bore and a second radial cylinder bore that are connected by the orifice. A first piston is disposed within the first radial cylinder bore and a second piston is disposed within the second radial cylinder bore. Since there is hydraulic fluid filling one of the radial bores in the pair, one of the pistons will always protrude from its corresponding radial bore.

The cylinder body would have as many radial cylinder bore pairs as necessary to achieve the functions described below. Further, the cylinder bores and connecting orifice are sized according to individual vehicle specifications.

The cam ring is generally circular, having an outer circumference and an inner circumference, with the inner circumference surrounding the longitudinal axis. The cam ring outer circumference is adjacent the pistons. The cam ring outer circumference also has one lobe for each radial cylinder bore pair. The lobes interact with the pistons. The cam ring is connected to and rotates ith one of the vehicle's output shafts or side gears.

As the cylinder body and cam ring rotate relative to one another, the protruding pistons come into contact with the cam ring lobes. For each radial cylinder bore pair, the cam ring lobe pushes the protruding piston radially outward into its radial cylinder bore. This motion displaces the hydraulic fluid from one radial cylinder bore through the orifice and into the adjoining radial cylinder bore where its mating piston is forced radially inward into contact with another lobe of the cam ring. This occurs concurrently for each cylinder bore pair since the cam ring lobes and cylinder bores are all equally spaced. Resistance of the hydraulic fluid to flow from one cylinder to the other restricts the speed with which differential rotation between the differential case and the side gear can occur, causing torque transfer between the two members.

An advantage of this system is that it functions automatically without manual driver activation and contains a minimal number of additional components within the differential.

These and other features of the invention may be best understood from the following specification and drawings. The following is a brief description of the drawings.

DETAILED DESCRIPTION OF THE PREFERRED EMBODIMENT

Figure 1:
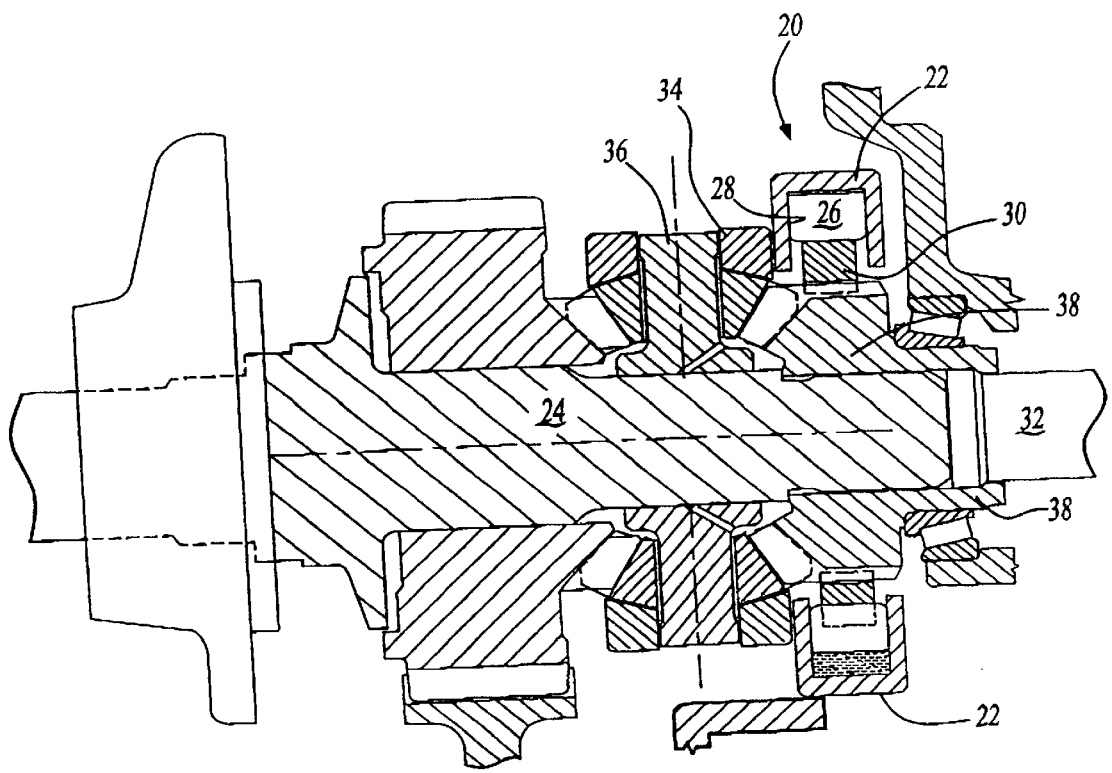
FIG. 1 is a cross sectional view of a system for an inter-axle differential designed according to this invention.

FIG. 1 illustrates a hydraulic device 20 to limit slip in a vehicle's inter-axle differential. The basic components of the hydraulic device are the same for both a vehicle's inter-axle differential and main differential. The components include a cylinder body 22 connected to rotate with the vehicle's input shaft 24, pistons 26, 27 (see FIG. 3) disposed within radial cylinder bores 28, 29 located in the cylinder body 22 and a cam ring 30 disposed adjacent the cylinder body 22 that interacts with the pistons 26, 27. The cam ring 30 is connected to and rotates with the vehicle's output shaft 32 either directly or through linkage. In FIG. 1, ring 30 is splined to a rear side gear 38 which is splined to shaft 32. Therefore, the cam ring 30 and the cylinder body 22 are able to rotate relative to each other.

For both inter-axle differentials and main differentials, the linkage between the cylinder body 22 and the input shaft 24 includes a differential case 34. In the inter-axle differential the linkage also includes a spider 36. Also in an inter-axle differential, the cam ring 30 is connected to the vehicle's rear side gear 38, which is connected to the output shaft 32.

Figure 2:
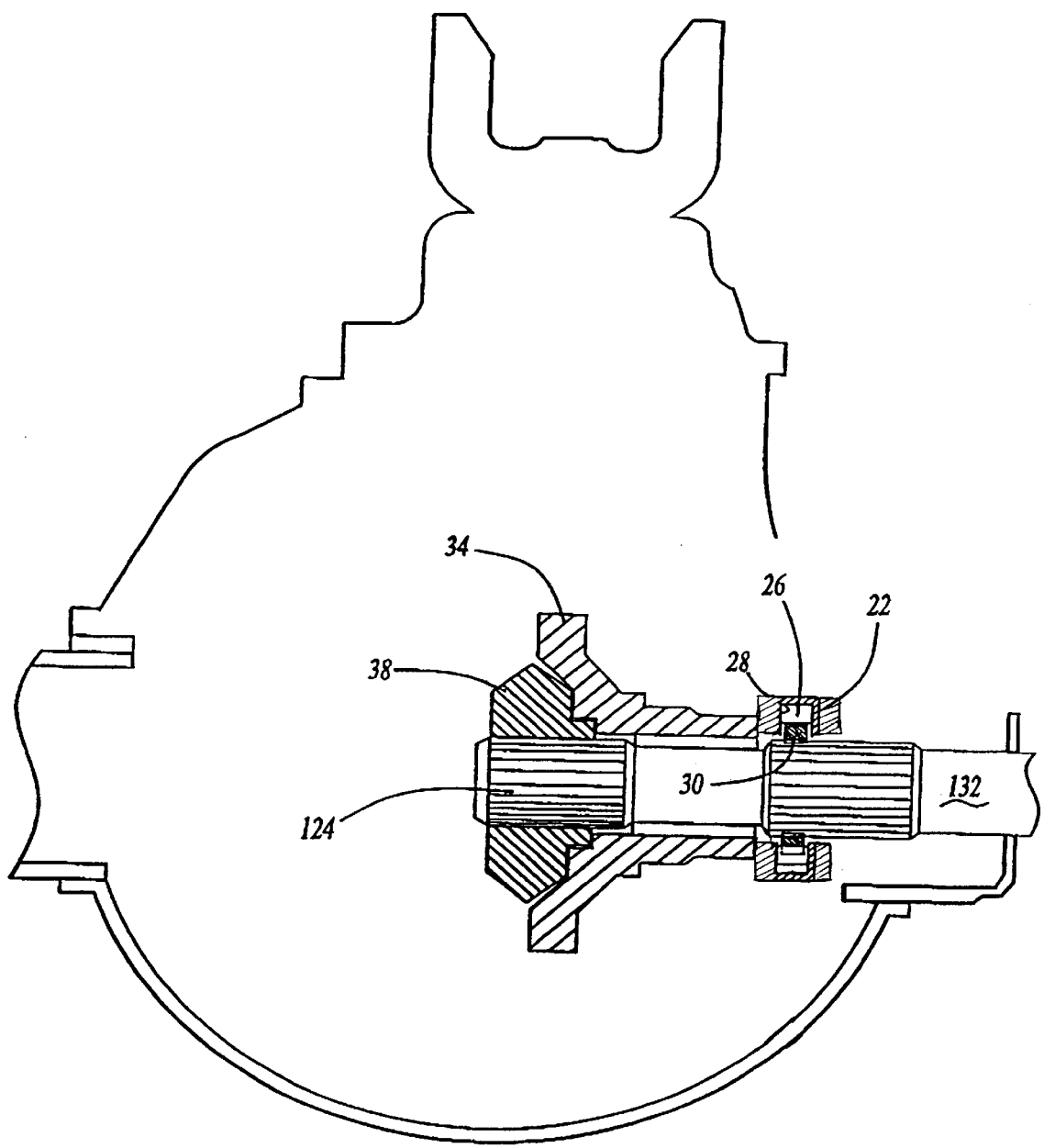
FIG. 2 is a cross sectional view of a system for a main differential designed according to this invention.
Figure 3:
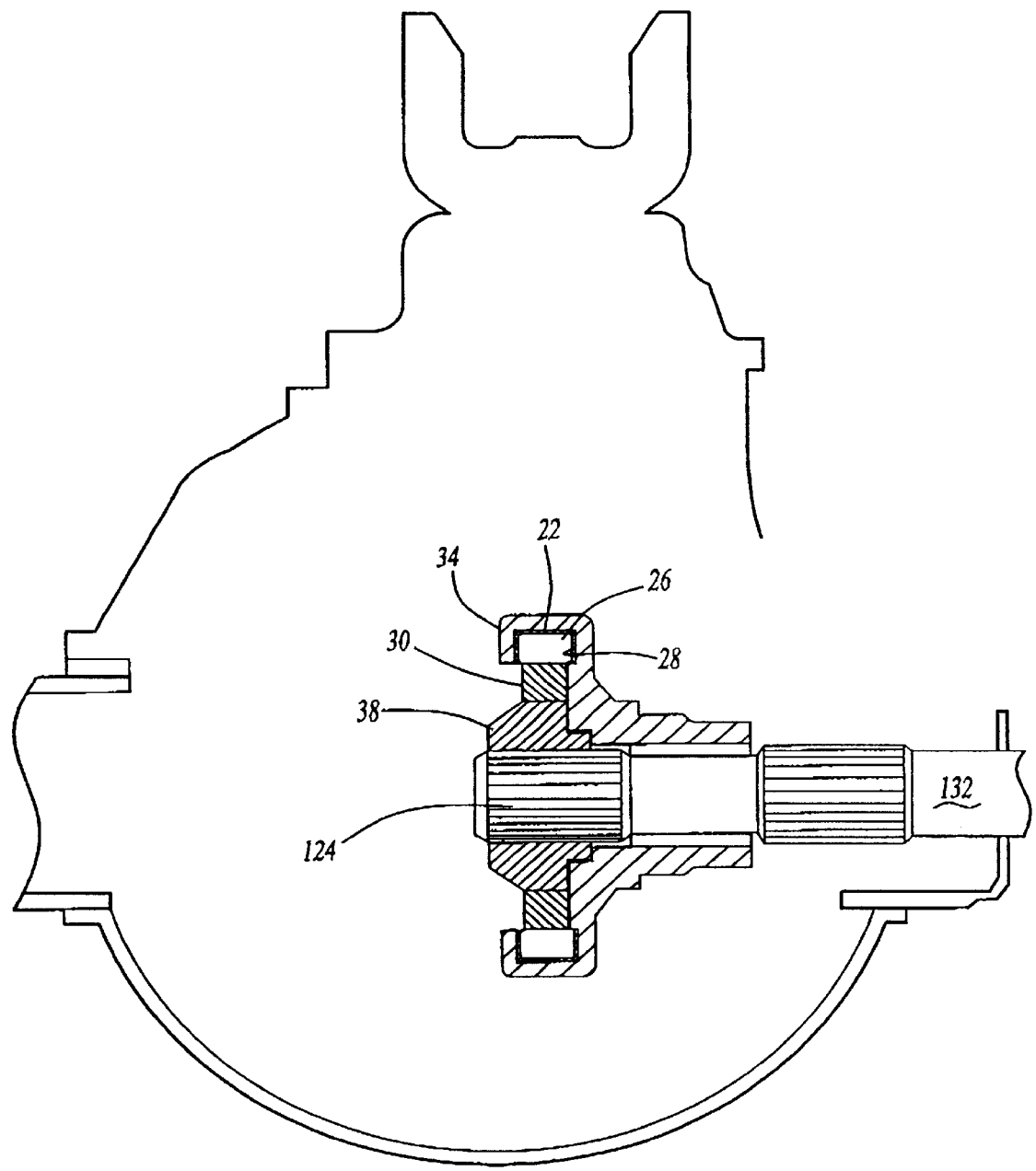
FIG. 3 is a cross sectional view of an alternative system for a main differential.

In a main differential, as shown in FIG. 2, the cam ring 30 is directly connected to the output shaft 132. Further, the output shaft 132 can more specifically be described as the vehicle's axle shaft. Alternatively, as shown in FIG. 3, the cam ring 30 may be connected to the side gear 38, wich is connected to the output shaft 132.

Figure 4:
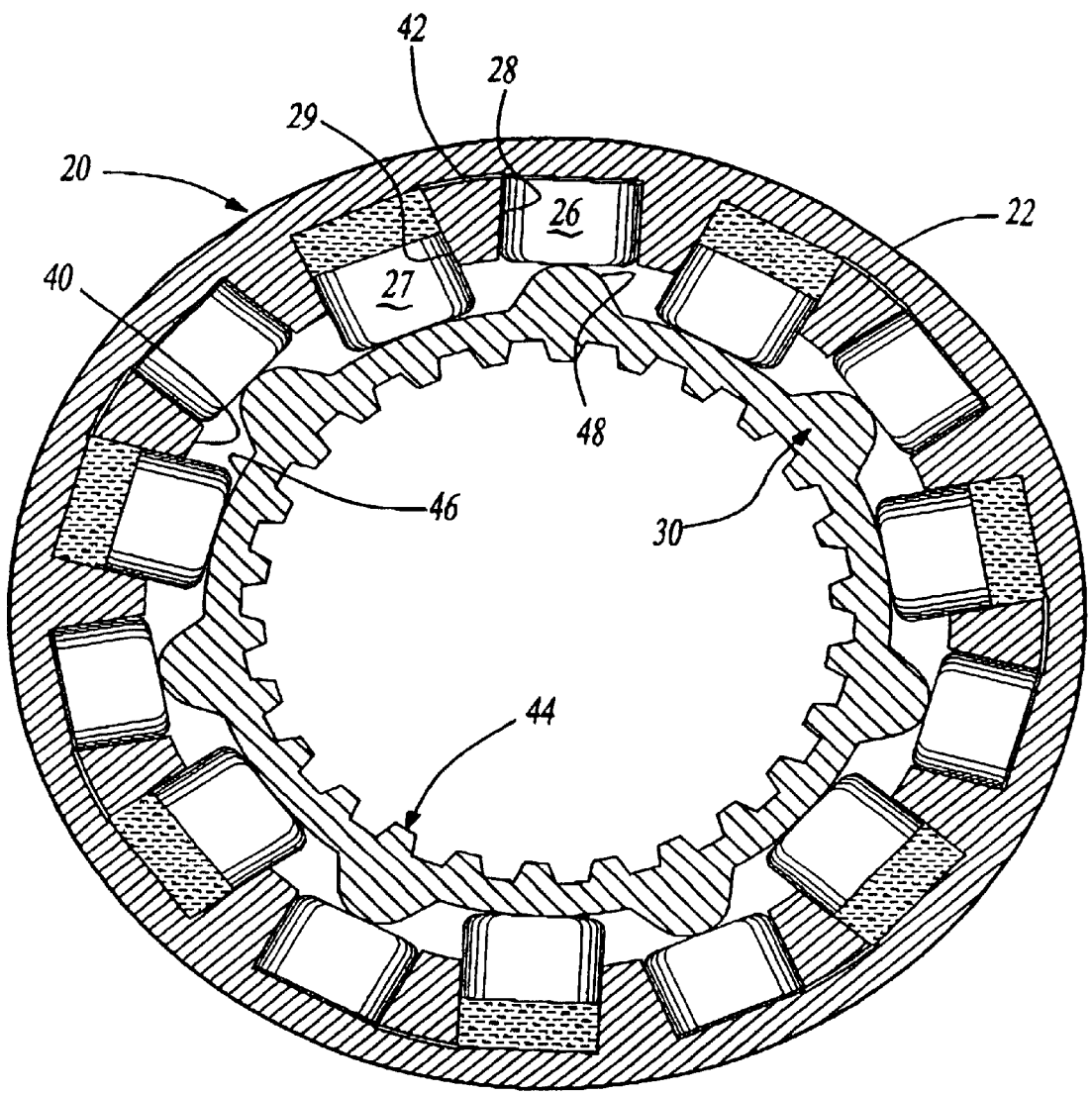
FIG. 4 is a cross sectional view of a cylinder assembly.

As shown in FIG. 4, the cylinder body 22 is generally ring-shaped having an interior bore 40 defining a longitudinal axis. The cam ring 30 is disposed within and freely rotates within the interior cylinder bore 40.

The cylinder body 22 has at least one pair of radial cylinder bores 28, 29 positioned around the cylinder body's interior bore 40. The paired radial cylinder bores 28, 29 are connected by an orifice 42. One of the cylinder bores 28, 29 is filled with a hydraulic fluid that can flow from one bore in the cylinder pair to the other bore in the cylinder pair through the orifice 42. Cylinder bore 29 is shown filled with hydraulic fluid in FIG. 4. Since there is hydraulic fluid filling one radial bore in the pair 28, 29, there is always one piston 26, 27 from the radial bore pair protruding from its radial bore. Piston 27 is shown protruding from its corresponding radial cylinder bore 29 in FIG. 4. The system is closed to contain the hydraulic fluid.

The cam ring 30 is generally circular or ring shaped having an interior bore 44 that surrounds the longitudinal axis. Preferably, the bore 44 of the cam ring is splined to cooperate with the vehicle rear side gear 38. The outer periphery of the cam ring 30 has one lobe 48 for every radial cylinder bore pair 28, 29.

This device limits the amount of slippage of the inter-axle differential or main differential by forcing components to move concurrently to transmit torque more efficiently. The interaction between the pistons 26, 27 and the cam ring 30 force movement of the cam ring 30 and all the components attached to it.

The present invention forces the output shaft 32 to rotate with the differential case 34, thus, maximizing the torque transmitted from the vehicle's input shaft 24 to the vehicle's wheels and minimizing slippage that occurs. The vehicle's input shaft 24 is powered by the vehicle's engine. In an inter-axle differential, the input shaft 24, spider 36, differential case 34 and cylinder body 22 are all connected and rotate concurrently (see FIG. 1). In a main differential, the input shaft 124, differential case 34, and cylinder body 22 are all connected and rotate concurrently. For both types of differentials, as the cylinder body 22 rotates the protruding pistons 26, 27 come into contact with the lobes 48 on the exterior of the cam ring 30.

There is one lobe 48 on the cam ring 30 per radial cylinder bore pair 28, 29. The lobe 48 is positioned relative to the radial bore pair 28, 29 to allow one piston 26, 27 to protrude from its corresponding radial cylinder bore 28, 29 while preventing the other piston 26, 27 from protruding from its corresponding radial cylinder bore 28, 29. The cam ring lobe 48 forces the protruding piston 26, 27 into its corresponding radial cylinder bore 28, 29. As the piston 26, 27 moves radially outward it forces the hydraulic fluid through the orifice 42 and into the other radial cylinder bore 28, 29 in the radial bore pair. As the hydraulic fluid enters the other radially cylinder bore 28, 29, it causes the other piston 26, 27 to protrude from its radial bore 28, 29. As shown, piston 27 is forced into contact with cam ring 30. The friction between the piston 26, 27 and the cam ring 30 due to the hydraulic fluid causes the ring to rotate if a sufficient speed difference exists.

The size of the orifice determines how fast the cylinder body can rotate before causing the cam ring to rotate. In otherwords, the larger the diameter of the orifice the more hydraulic fluid that can flow through the orifice resulting in less efficient torque transmission to the vehicle's wheels. There is less efficient torque transmission because more relative motion is allowed between the cylinder body and cam ring. Thus, more slippage occurs between the cylinder body and can ring. On the other hand, the smaller the orifice the less hydraulic fluid that can flow through the orifice resulting in more efficient torque transmission to the vehicle's wheels. There is more efficient torque transmission because less relative motion is allowed between the cylinder body and cam ring. Thus, less slippage occurs between the cylinder body and cam ring. The orifice is sized according to individual vehicle specifications.

Specifically, as shown in FIG. 3, each cylinder bore pair includes a first radial cylinder bore 28 and a second radial cylinder bore 29. The radial cylinder bores 28, 29 are connected by the orifice 42. A first piston 26 is disposed within the first radial cylinder bore 28 and a second piston 27 is disposed within the second radial cylinder bore 29.

The invention has been described in an illustrative manner, and it is to be understood that the terminology that has bee used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A hydraulic device to limit slip in a vehicle's differential comprising:

a cylinder body mounted for rotation with an input shaft, wherein said cylinder body has at least one pair of cylinder bores interconnected by an orifice to define a discrete flow path between said cylinder bores wherein one of said cylinder bore per cylinder bore pair receives a hydraulic fluid;

a piston disposed within each of said cylinder bores; and a cam ring disposed adjacent said cylinder body to interact with said pistons, said cam ring mounted for rotation with a vehicle's output shaft wherein said orifice is set to a predetermined size to control slip between said cylinder body and said cam ring.

2. The hydraulic device of claim 1, wherein said cylinder body is connected to the input shaft by a differential case connected to and rotating with said cylinder body and a spider connected to and rotating with said differential case and the input shaft.

3. The hydraulic device of claim 1, wherein said cam ring is connected to the output shaft by a rear side gear connected to and rotating with said cam ring and the output shaft.

4. The hydraulic device of claim 1, wherein said cam ring is directly connected to the output shaft.

5. The hydraulic device of claim 1, wherein said cylinder body is generally ring-shaped, having an interior bore surrounding a longitudinal axis and wherein said cylinder bores are spaced radially around said cylinder body interior bore.

6. The hydraulic device of claim 5, wherein said cam ring is generally ring-shaped having an outer circumference an an inner circumference, said inner circumference surrounding the longitudinal axis, and said cam ring having at least one lobe at said outer circumference for each said radial cylinder bore pair, said lobe interacting with said pistons.

7. The hydraulic device of claim 6, wherein said cam ring inner circumference is splined to connect to said output shaft.

8. The hydraulic device of claim 7, wherein rotation of the input shaft causes said cylinder body to rotate, and as said cylinder body rotates one of said pistons in each said pair comes into contact with said at least one cam ring lobe.

9. The hydraulic device of claim 8, wherein said cam ring lobe causes a first piston to move into said first radial cylinder bore, said first piston forces said hydraulic fluid out of a first radial cylinder bore through said orifice and into a second radial cylinder bore causing a second piston to protrude from said second radial cylinder bore and into contact with said cam ring.

10. The hydraulic device of claim 9, wherein a size of said orifice determines how fast said cylinder body can rotate before causing said cam ring to rotate.

11. The hydraulic device of claim 1, wherein the differential is a main differential.

12. The hydraulic device of claim 1, wherein the differential is an inter-axle differential.

13. A vehicle differential comprising:
   an input shaft driven by an engine;
   a spider rotatingly connected to said input shaft;
   a differential case rotatingly connected to said spider;
   a cylinder body rotatingly connected to said differential case, wherein said cylinder body is generally ring-shaped having an interior bore surrounding a longitudinal axis, said cylinder body having at least one pair of cylinder bores spaced radially around said cylinder body interior bore, said pair of cylinder bores being connected by an orifice to define a discrete flow path between said cylinder bores and wherein one of said cylinder bore per cylinder bore pair receives a hydraulic fluid;
   a piston disposed within each of said cylinder bores;
   a cam ring disposed adjacent said cylinder body bores, said cam ring having an inner circumference and an outer circumference, said inner circumference surrounding the longitudinal axis and said outer circumference forming a lobe for each of said radial cylinder bore pairs, said lobe interacting with said pistons; and
   an output shaft rotatingly connected to said cam ring.

14. The vehicle differential of claim 13, wherein each said radial cylinder bore pair comprises a first radial cylinder bore and a second radial cylinder bore connected by said orifice, a first piston disposed within said first radial cylinder bore, and a second piston disposed within said second radial cylinder bore.

15. The vehicle differential in claim 14, wherein said cam ring lobe causes said first piston to recede into said first radial cylinder bore, recession of said first piston forces said hydraulic fluid out of said first radial cylinder bore through said orifice and into said second radial cylinder bore causing said second piston to protrude from said second radial cylinder bore.

16. The vehicle differential in claim 15, wherein contact between said cam ring and said pistons causes said cam ring to rotate with said cylinder body.

17. A hydraulic device to limit slip in a vehicle's differential comprising:
   a cylinder body mounted for rotation with an input shaft, wherein said cylinder body has a plurality of pairs of cylinder bores spaced radially about the circumference of said cylinder body with each pair of cylinder bores including a first bore interconnected to a second bore by an orifice to define a discrete flow path within each of said pairs of cylinder bores such that each flow path is isolated from all other flow paths;
   a piston disposed within each of said cylinder bores; and
   a cam ring disposed adjacent said cylinder body to interact with said pistons, said cam ring mounted for rotation with a vehicle's output shaft wherein said orifice is set to a predetermined size to control slip between said cylinder body and said cam ring.

18. The hydraulic device of claim 17, wherein said cam ring includes one lobe for each pair of cylinder bores.

19. The hydraulic device of claim 18, wherein said lobes are formed about an outer circumference of said cam ring.

20. A vehicle differential comprising:
   an input shaft driven by an engine;
   a spider rotatingly connected to said input shaft;
   a differential case rotatingly connected to said spider;
   a cylinder body rotatingly connected to said differential case, wherein said cylinder body is generally ring-shaped having an interior bore surrounding a longitudinal axis, said cylinder body having a plurality of pairs of cylinder bores spaced radially around said cylinder body interior bore wherein each pair of cylinder bores includes a first bore interconnected to a second bore by an orifice to define a discrete flow path within each of said pairs of cylinder bores such that each flow path is isolated from all other flow paths
   a piston disposed within each of said cylinder bores;
   a cam ring disposed adjacent said cylinder body bores, said cam ring having an inner circumference and an outer circumference, said inner circumference surrounding the longitudinal axis and said outer circumference forming a lobe for each of said radial cylinder bore pairs, said lobe interacting with said pistons; and
   an output shaft rotatingly connected to said cam ring.

21. The vehicle differential of claim 20 wherein each of said orifices is set to a predetermined size to control slip between said cylinder body and said cam ring.

22. A hydraulic device to limit slip in a vehicle's differential comprising:
   a cylinder body mounted for rotation with an input shaft;
   a plurality of pairs of cylinder bores formed within said cylinder body with each pair of cylinder bores including a first cylinder bore interconnected to a second cylinder bore to define a discrete flow between said first and second cylinder bores such that the flow path of one pair of cylinder bores is isolated from flow paths of all other pairs of cylinder bores;

a piston disposed within each of said cylinder bores; and a cam ring mounted for rotation with an output shaft, said cam ring having one lobe for each of said pairs of cylinder bores wherein said lobe engages one of said pistons per pair of cylinder bores to move fluid between said first and second cylinder bores via said respective discrete flow path to control relative rotation between said cylinder body and said cam ring.

23. The hydraulic device of claim 22, wherein said orifices are each set to a predetermined size to control slip between said cylinder body and said cam ring.

24. The hydraulic device of claim 23, wherein said pairs of cylinder bores are radially spaced about the circumference of said cylinder body.

* * * * *